US012555927B2

(12) United States Patent
Kinugawa et al.

(10) Patent No.: US 12,555,927 B2
(45) Date of Patent: Feb. 17, 2026

(54) ANTENNA MODULE, COMMUNICATION DEVICE INCLUDING THE SAME, AND METHOD FOR MANUFACTURING ANTENNA MODULE

(71) Applicant: Murata Manufacturing Co., Ltd., Nagaokakyo (JP)

(72) Inventors: Kouta Kinugawa, Nagaokakyo (JP); Atsushi Kasuya, Nagaokakyo (JP); Michiharu Yokoyama, Nagaokakyo (JP); Kengo Onaka, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 320 days.

(21) Appl. No.: 18/480,541

(22) Filed: Oct. 4, 2023

(65) Prior Publication Data

US 2024/0120663 A1 Apr. 11, 2024

(30) Foreign Application Priority Data

Oct. 5, 2022 (JP) ................................ 2022-161180

(51) Int. Cl.
*H01Q 21/06* (2006.01)
*H01Q 9/04* (2006.01)

(52) U.S. Cl.
CPC ........... *H01Q 21/065* (2013.01); *H01Q 9/045* (2013.01)

(58) Field of Classification Search
None
See application file for complete search history.

(56) References Cited

U.S. PATENT DOCUMENTS

2018/0241129 A1* 8/2018 Pance ................ H01Q 21/0075

FOREIGN PATENT DOCUMENTS

| | | | |
|---|---|---|---|
| JP | H05-226519 | A | 9/1993 |
| JP | 2016-039341 | A | 3/2016 |
| JP | 2018-182192 | A | 11/2018 |
| JP | 2019-068013 | A | 4/2019 |
| WO | 2021/059671 | A1 | 4/2021 |

* cited by examiner

*Primary Examiner* — Henry Luong
(74) *Attorney, Agent, or Firm* — XSENSUS LLP

(57) ABSTRACT

An antenna module includes an antenna substrate and a feed circuit. The antenna substrate has an upper surface and a lower surface, and a radiating element having a flat plate shape is arranged in the antenna substrate. The feed circuit 105 is mounted on the lower surface of the antenna substrate and supplies a radio frequency signal to the radiating element. The antenna substrate includes a dielectric substrate on which the radiating element is arranged, a ground electrode, a feed wiring, and carbides. The ground electrode is arranged between the radiating element and the lower surface in the dielectric substrate. The feed wiring transmits the radio frequency signal supplied from the feed circuit to the radiating element. The carbides are disposed on at least a part of a side surface connecting the upper surface and the lower surface in the dielectric substrate.

20 Claims, 9 Drawing Sheets

$$\begin{cases} \phi max = \alpha + \beta \\ \beta = \tan^{-1} \frac{\Delta W}{h1 - h2} \end{cases}$$

ANTENNA MODULE, COMMUNICATION DEVICE INCLUDING THE SAME, AND METHOD FOR MANUFACTURING ANTENNA MODULE

CROSS-REFERENCE TO RELATED APPLICATION

This application claims priority to Japanese application no. 2022-161180, filed Oct. 5, 2022, the entire contents of which is hereby incorporated by reference.

BACKGROUND

1. Field

The present disclosure relates to an antenna module, a communication device including the antenna module, and a method for manufacturing the antenna module, and, more specifically, relates to a technique for suppressing deterioration of antenna characteristics due to noise.

2. Description of the Related Art

International Publication No. 2021/059671 discloses an antenna module in which a feed component including an RFIC is mounted on an antenna substrate on which a feed element is arranged. In the antenna module disclosed in International Publication No. 2021/059671, a feed path from the RFIC to the feed element is configured by a connection member such as a solder bump used for mounting the feed component on the antenna substrate, a wiring pattern and a via in the antenna substrate, and the like.

In general, when a radio frequency signal is supplied to a feed element in an antenna module, noise in the same frequency band as the radio frequency signal to be radiated may be generated not only from the feed element but also from a feed path for transmitting the radio frequency signal. In addition, when power is supplied to a feed circuit and an intermediate frequency signal is transmitted to the feed circuit via an antenna substrate, noise caused by a power supply signal and the intermediate frequency signal may be generated from a signal transmission path in the antenna substrate.

When the noise generated from the feed path and the signal transmission path interferes with a radio wave radiated from the feed element, the communication quality may be degraded, and as a result, the antenna characteristics may be deteriorated.

SUMMARY

The present disclosure has been made to solve such a problem, and the present disclosure provides reducing an influence of interference of noise generated from a wiring path in an antenna substrate in an antenna module in which a feed circuit is mounted on the antenna substrate, and to suppress deterioration of antenna characteristics.

An antenna module according to an aspect of the present disclosure includes an antenna substrate and a feed circuit. The antenna substrate has a first surface and a second surface, and a first radiating element having a flat plate shape is arranged on the antenna substrate. The feed circuit is mounted on the second surface of the antenna substrate and supplies a radio frequency signal to the first radiating element. The antenna substrate includes a dielectric substrate on which the first radiating element is arranged, a ground electrode, a feed wiring, and carbide. The ground electrode is arranged between the first radiating element and the second surface in the dielectric substrate. The feed wiring transmits a radio frequency signal supplied from the feed circuit to the first radiating element. The carbide is disposed on at least a part of a side surface connecting the first surface and the second surface in the dielectric substrate.

A method for manufacturing an antenna module according to another aspect of the present disclosure includes: (a) preparing an antenna substrate which has a first surface and a second surface and on which a first radiating element having a flat plate shape is arranged; (b) mounting a feed circuit for supplying a radio frequency signal to the first radiating element on the second surface of the antenna substrate; and (c) irradiating a side surface connecting the first surface and the second surface in the antenna substrate with a laser beam from the second surface side of the antenna substrate. A carbide is formed on at least a part of the side surface of the antenna substrate by the step of irradiating with the laser beam.

In the antenna module according to the present disclosure, the carbide is disposed on at least a part of the side surface of the dielectric substrate constituting the antenna substrate. The carbide functions as an electromagnetic shield, and at least a part of noise generated from a wiring path in the antenna substrate is shielded by the carbide. With this configuration, in the antenna module in which the feed circuit is mounted on the antenna substrate, it is possible to reduce the influence of the interference of the noise generated from the wiring path in the antenna substrate on the radiated radio wave and suppress the deterioration of the antenna characteristics.

DETAILED DESCRIPTION

Figure 1:
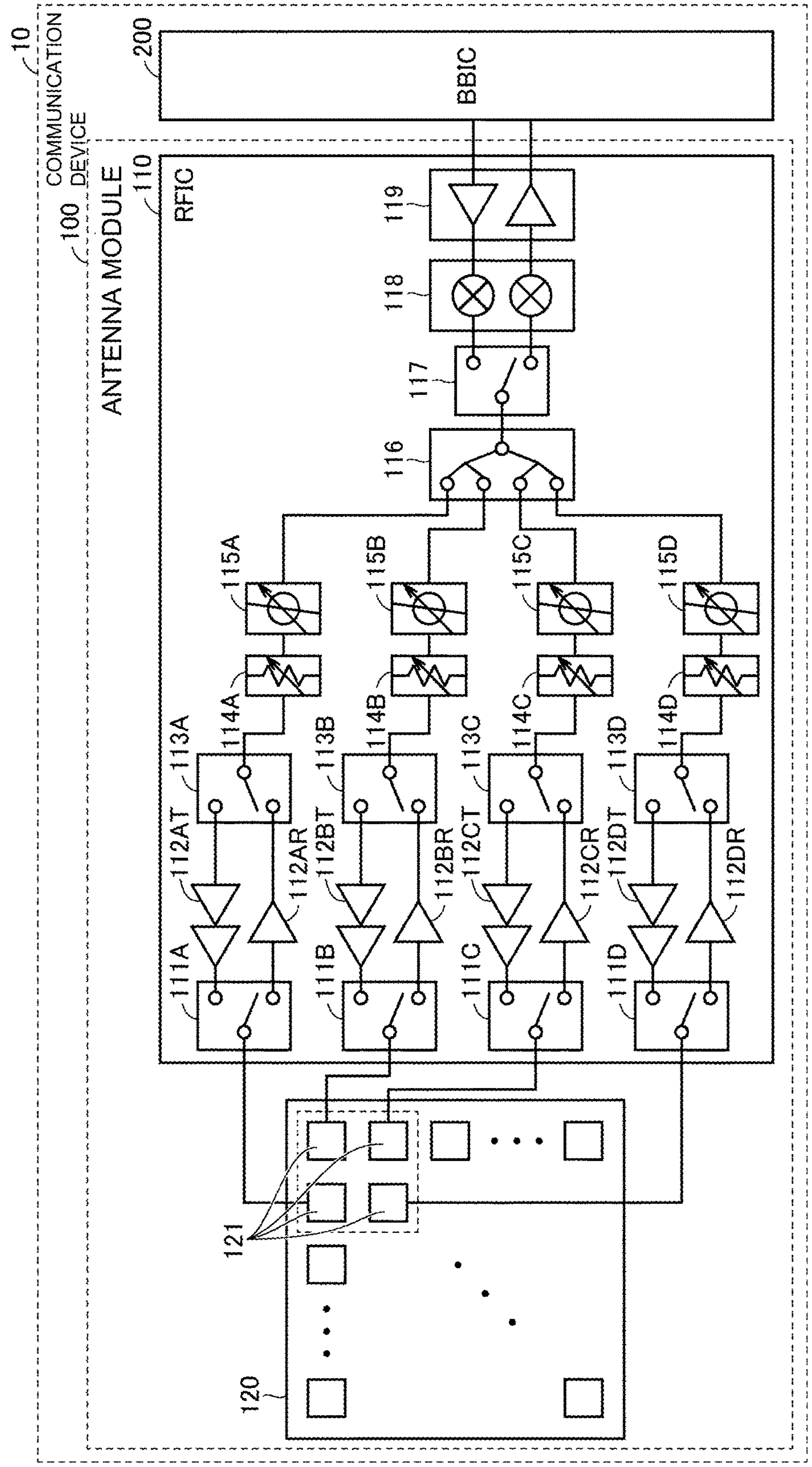
FIG. 1 is a block diagram of a communication device to which an antenna module according to Embodiment 1 is applied.

Hereinafter, embodiments of the present disclosure will be described in detail with reference to the drawings. Note that the same or corresponding parts in the drawings are denoted by the same reference numerals, and description thereof will not be repeated.

Embodiment 1

Basic Configuration of Communication Device

FIG. 1 is an example of a block diagram of a communication device 10 according to an exemplary embodiment. The communication device 10 is, for example, a mobile terminal such as a mobile phone, a smartphone, or a tablet, a personal computer having a communication function, or a base station. An example of bands of frequencies of radio waves used in an antenna module 100 according to the exemplary embodiment is radio waves in a millimeter wave band whose center frequencies are, for example, 28 GHz, 39 GHz, 60 GHz, and the like, but the features of the present disclosure can also be applied to radio waves in other bands of frequencies.

Referring to FIG. 1, the communication device 10 includes the antenna module 100 and a BBIC 200 constituting a baseband signal processing circuit. The antenna module 100 includes an RFIC 110 and an antenna substrate 120. The communication device 10 up-converts a signal transmitted from the BBIC 200 to the antenna module 100 into a radio frequency signal and radiates the radio frequency signal from the antenna substrate 120, and down-converts a radio frequency signal received by the antenna substrate 120 and processes the radio frequency signal in the BBIC 200.

In FIG. 1, for ease of description, only configurations corresponding to four radiating elements 121 among a plurality of radiating elements 121 arranged in the antenna substrate 120 are illustrated, and configurations corresponding to the other radiating elements 121 each having the same configuration are omitted. Note that although FIG. 1 illustrates an example in which the antenna substrate 120 is formed by the plurality of radiating elements 121 arranged in a two-dimensional array, but the number of radiating elements 121 is not necessarily plural, and the antenna substrate 120 may be formed by one radiating element 121. Alternatively, a one-dimensional array in which the plurality of radiating elements 121 is arranged in a line may be adopted. In the present embodiment, the radiating element 121 is described as an example of a patch antenna having a substantially square flat plate shape, but the shape of the radiating element 121 may be a circle, an ellipse, or another polygon such as a hexagon.

The RFIC 110 includes switches 111A to 111D, 113A to 113D, and 117, power amplifiers 112AT to 112DT, low-noise amplifiers 112AR to 112DR, attenuators 114A to 114D, phase shifters 115A to 115D, a signal combiner/splitter 116, a mixer 118, and an amplifier circuit 119.

When a radio frequency signal is transmitted, the switches 111A to 111D and 113A to 113D are switched to the power amplifiers 112AT to 112DT side, and the switch 117 is connected to a transmission-side amplifier of the amplifier circuit 119. When a radio frequency signal is received, the switches 111A to 111D and 113A to 113D are switched to the low-noise amplifiers 112AR to 112DR side, and the switch 117 is connected to a reception-side amplifier of the amplifier circuit 119.

The signal transmitted from the BBIC 200 is amplified by the amplifier circuit 119 and up-converted by the mixer 118. The transmission signal, which is an up-converted radio frequency signal, is divided into four signals by the signal combiner/splitter 116, and each of the divided signals passes through four signal paths to fed to different radiating elements 121 respectively. At this time, it is possible to adjust the directivity of the antenna substrate 120 by individually adjusting phase shift degrees of the phase shifters 115A to 115D arranged in the respective signal paths. In addition, the attenuators 114A to 114D adjust the intensity of the transmission signal.

Reception signals, which are radio frequency signals received by each of the radiating elements 121, respectively pass through four different signal paths and are combined by the signal combiner/splitter 116. The combined reception signal is down-converted by the mixer 118, amplified by the amplifier circuit 119, and transmitted to the BBIC 200.

The RFIC 110 is formed as a single-chip integrated circuit component including the above-described circuit configuration, for example. Alternatively, devices (switches, power amplifiers, low-noise amplifiers, attenuators, phase shifters) corresponding to each of the radiating elements 121 in the RFIC 110 may be formed as a single-chip integrated circuit component for each of the corresponding radiating elements 121.

Antenna Module Configuration

Figure 2:
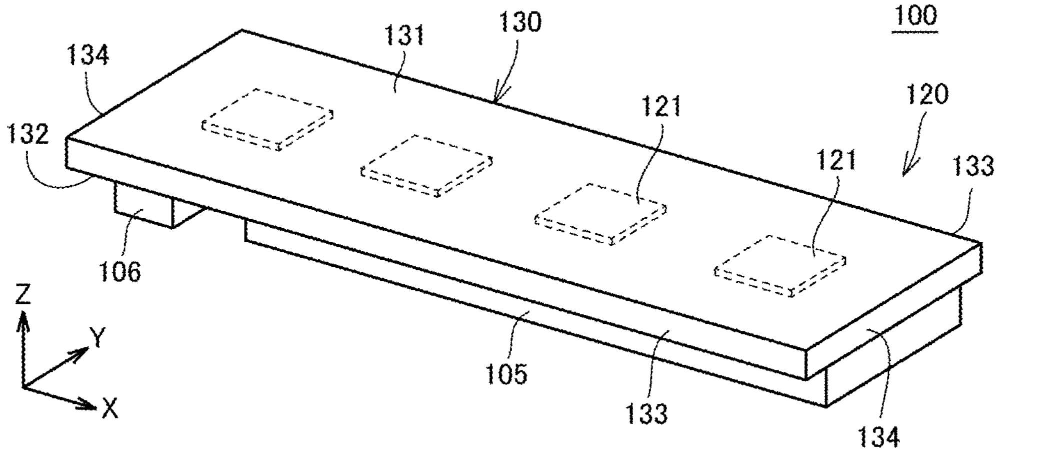
FIG. 2 is a perspective view of the antenna module according to Embodiment 1.

Next, the antenna module 100 will be described in detail with reference to FIG. 2 and FIG. 3. FIG. 2 is a perspective view of the antenna module 100. In addition, FIG. 3 is a transparent cross-sectional view of the antenna module 100 when viewed from a positive direction of the X axis in FIG. 2.

Figure 3:
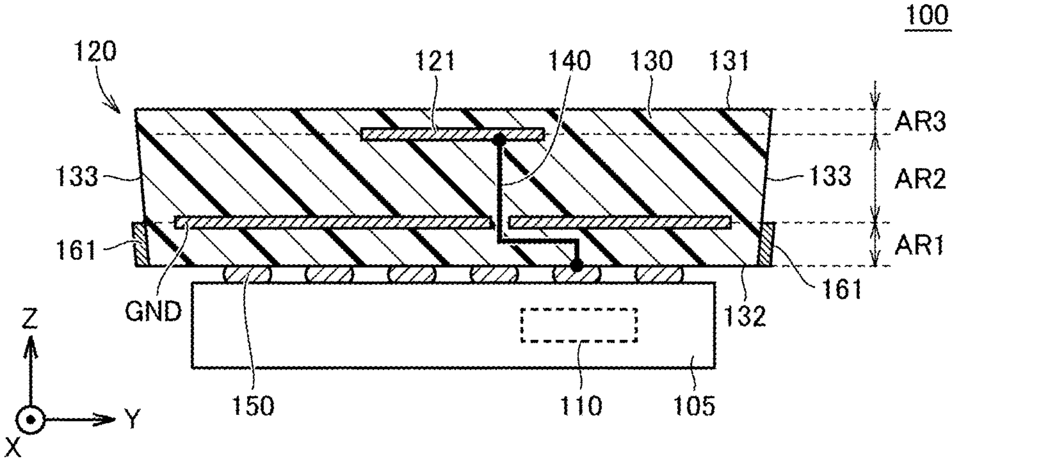
FIG. 3 is a transparent cross-sectional view of the antenna module of FIG. 2 when viewed from an X-axis direction.

Referring to FIG. 2 and FIG. 3, the antenna module 100 includes a feed circuit 105 including the RFIC 110 and a connector 106, in addition to the antenna substrate 120. Further, in addition to the radiating elements 121, the antenna substrate 120 includes a dielectric substrate 130, a feed wiring 140, and a ground electrode GND.

The dielectric substrate 130 is, for example, a low temperature co-fired ceramics (LTCC) multilayer substrate, a multilayer resin substrate formed by laminating a plurality of resin layers made of resin such as epoxy or polyimide, a multilayer resin substrate formed by laminating a plurality of resin layers made of a liquid crystal polymer (LCP) having a lower dielectric constant, a multilayer resin substrate formed by laminating a plurality of resin layers made of a fluororesin, a multilayer resin substrate formed by laminating a plurality of resin layers made of a polyethylene terephthalate (PET) material, or a ceramic multilayer substrate other than LTCC. Note that the dielectric substrate 130 does not necessarily have a multilayer structure, and may be a single-layer substrate. The dielectric substrate 130 according to Embodiment 1 is formed of a material containing a carbon component.

The dielectric substrate 130 has a flat plate shape having two main surfaces. The dielectric substrate 130 has a substantially rectangular shape in plan view from a normal direction of the main surface. In the following description, the normal direction of the main surface is defined as a Z-axis direction, a direction along a long side of the main surface is defined as an X-axis direction, and a direction along a short side of the main surface is defined as a Y-axis direction. Note that in each drawing, a positive direction of the Z axis may be referred to as upward, and a negative direction of the Z axis may be referred to as downward.

The dielectric substrate 130 includes an upper surface 131 which is a main surface in the positive direction of the Z axis, and a lower surface 132 which is a main surface in the negative direction of the Z axis. In addition, the dielectric substrate 130 includes a side surface 133 intersecting the Y axis and connecting the upper surface 131 and the lower surface 132, and a side surface 134 intersecting the X axis and connecting the upper surface 131 and the lower surface 132.

In the dielectric substrate 130, four radiating elements 121 are arranged along the X axis in an inner layer close to the upper surface 131. In addition, in the dielectric substrate 130, the ground electrode GND is arranged in a layer between the radiating element 121 and the lower surface 132 so as to face the radiating element 121.

The feed circuit 105 and the connector 106 are mounted on the lower surface 132 of the dielectric substrate 130 via a solder bump 150. The feed circuit 105 includes the RFIC 110 described in FIG. 1. In addition, the feed circuit 105 also includes a power management integrated circuit (PMIC) that controls the power source for supplying power to the RFIC 110, a power inductor, and the like.

The connector 106 is a connection member for connecting the antenna module 100 to a mounting substrate on which the BBIC 200 in FIG. 1 is arranged. A power supply signal and an intermediate frequency signal transmitted from the circuit of the mounting substrate via the connector 106 are transmitted to the feed circuit 105 through the dielectric substrate 130.

A radio frequency signal is supplied to the radiating elements 121 from the RFIC 110 included in the feed circuit 105 via the feed wiring 140 arranged in the dielectric substrate 130. In a layer (wiring layer) between the ground electrode GND and the lower surface 132, the feed wiring 140 extends from the solder bump 150 to below the radiating element 121 of the power supply target, passes through the ground electrode GND from there, and is connected to the target radiating element 121. When a radio frequency signal having a frequency corresponding to a resonant frequency of the radiating element 121 is supplied to the radiating element 121, a radio wave having the frequency is radiated from the radiating element 121 in the Z-axis direction.

As illustrated in FIG. 3, a dimension of the lower surface 132 of the dielectric substrate 130 in the Y-axis direction is smaller than a dimension of the upper surface 131 in the Y-axis direction. That is, the side surface 133 of the dielectric substrate 130 is inclined with respect to the Z-axis direction.

In antenna module 100 according to Embodiment 1, carbide is disposed on at least a part of the side surface 133 of the dielectric substrate 130. On the side surface 133 of the dielectric substrate 130, when a region between the lower surface 132 and the ground electrode GND is defined as a first region AR1, a region between the ground electrode GND and the radiating element 121 is defined as a second region AR2, and a region between the radiating element 121 and the upper surface 131 is defined as a third region AR3, in the case of FIG. 3, a carbide 161 is arranged in at least a part of the first region AR1.

In the antenna module 100, as described above, the power supply signal and the intermediate frequency signal transmitted from the mounting substrate via the connector 106 are supplied to the feed circuit 105 through the wiring layer corresponding to the first region AR1 in the dielectric substrate 130. In addition, a part of the feed wiring 140 for supplying the radio frequency signal converted from the intermediate frequency signal at the RFIC 110 in the feed circuit 105 also extends to the lower portion of each of the radiating elements 121 through the wiring layer.

In general, when a signal is transmitted by a wiring, the wiring functions as an antenna, and an electromagnetic wave corresponding to the frequency of the signal transmitted from each wiring is radiated. Therefore, radio waves corresponding to the power supply signal, the intermediate frequency signal, and the radio frequency signal may be generated from the wiring layer between the lower surface 132 of the dielectric substrate 130 and the ground electrode GND. When such electromagnetic waves electromagnetically interfere with radio waves radiated from the radiating element 121, electromagnetic noise is generated, and as a result, antenna characteristics may be deteriorated.

In the antenna module 100 according to Embodiment 1, the carbide 161 is arranged in at least a part of the region (first region AR1) of the side surface 133 of the dielectric substrate 130 corresponding to the wiring layer. Since the carbide 161 has conductivity, it functions as an electromagnetic shield against electromagnetic waves generated from the wiring in the wiring layer, and can shield the generated electromagnetic waves. As a result, it is possible to suppress electromagnetic field coupling between the electromagnetic wave generated from the wiring in the wiring layer and the radio wave radiated from the radiating element 121, and thus it is possible to suppress deterioration in antenna characteristics. In addition, since electromagnetic field coupling between electromagnetic wave noise from the outside of the antenna module 100 and the wiring in the wiring layer is also suppressed, it is possible to reduce the influence of noise caused by electromagnetic waves from the outside.

Note that as will be described later with reference to FIG. 10, in the manufacturing process of the antenna module 100, a dielectric substrate on which a plurality of antenna modules is formed is cut and divided into individual antenna modules using a laser beam. The carbide 161 is formed on the side surface of the dielectric substrate by carbonizing a carbon component contained in the dielectric substrate by the laser beam used in the cutting process.

In general, when an electromagnetic shield is formed by coating a metal material or the like, sputtering may be used. In the case of such a sputter shield, it is necessary to mask portions other than the portion to be coated, which complicates the manufacturing process and may increase the time and the cost required for manufacturing. However, in the antenna module 100 according to Embodiment 1, the carbide 161 is naturally formed on the side surface of the dielectric substrate 130 by the action of the laser beam used in the cutting process for dividing the individual antenna modules. Therefore, an additional process for forming the shield is not required, and an increase in time and cost required for manufacturing is suppressed.

In order to enhance the effect as the electromagnetic shield, it is desirable to arrange the carbide 161 in a range as wide as possible in the first region AR1 of the side surface 133 of the dielectric substrate 130. When the carbide secondarily formed in the cutting process as described above is used as an electromagnetic shield, there may be a case where the carbide is not necessarily uniformly arranged over the entire desired range. However, since the partially formed carbide can shield not a little electromagnetic wave, a certain effect can be obtained in suppressing the deterioration of the antenna characteristics. Note that it is also possible to increase the generation of carbide by reducing a feed rate of the laser beam or increasing the intensity of the laser beam in the cutting process.

In addition, the effect of electromagnetic shielding by the carbide 161 can be further enhanced by connecting the carbide 161 to the ground potential by exposing a part of the ground electrode GND to the side surface of the dielectric substrate 130, for example.

Modification of Carbide Position

Next, variations in the position of the carbide disposed on the dielectric substrate will be described with reference to FIG. 4 to FIG. 8.

(a) First Modification

Figure 4:
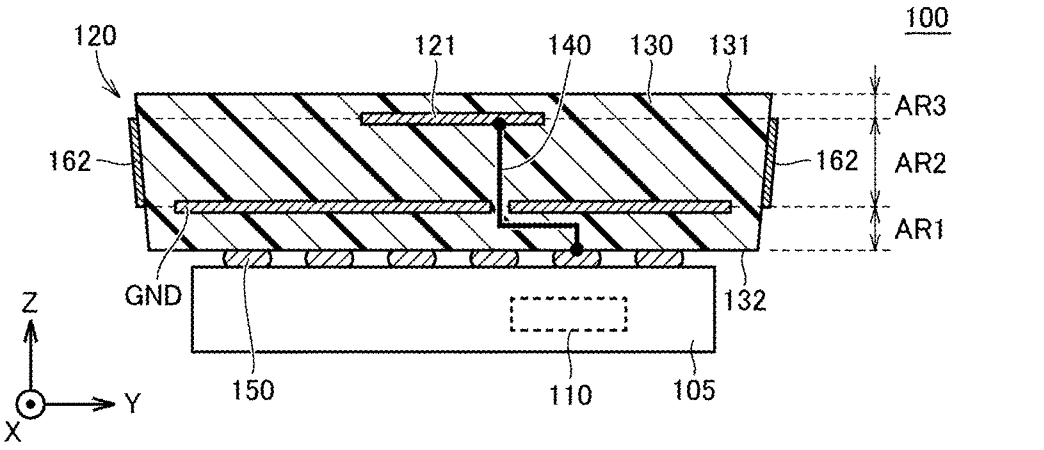
FIG. 4 is a transparent cross-sectional view illustrating a first modification of a carbide position.

FIG. 4 is a transparent cross-sectional view illustrating a first modification of a carbide position in the antenna module 100. In the antenna module 100 of FIG. 4, a carbide 162 is arranged in at least a part of the second region AR2 between the radiating element 121 and the ground electrode GND on the side surface 133 of the dielectric substrate 130.

In the dielectric substrate 130 corresponding to the second region AR2, a portion of the feed wiring 140 extending from below the ground electrode GND to the radiating element 121 is arranged. Since a radio frequency signal is transmitted to the radiating element 121 by the feed wiring 140, an electromagnetic wave in the same frequency band as the radio wave radiated from the radiating element 121 may be generated from the feed wiring 140. Therefore, by disposing the carbide 162 in the second region AR2 of the dielectric substrate 130, the shielding effect on the side surface 133 of the dielectric substrate 130 is enhanced, and thus the radiation of radio waves in the side surface direction of the dielectric substrate 130 is suppressed. As a result, the radiation ratio of the radio wave in the normal direction of the dielectric substrate 130, is increased, so that the directivity of the radio wave radiated from the radiating element 121 can be improved.

(b) Second Modification

In a second modification, an example in which the carbide is disposed on the side surface in the radiation direction of the radio wave relative to the radiating element will be described.

Figure 5:
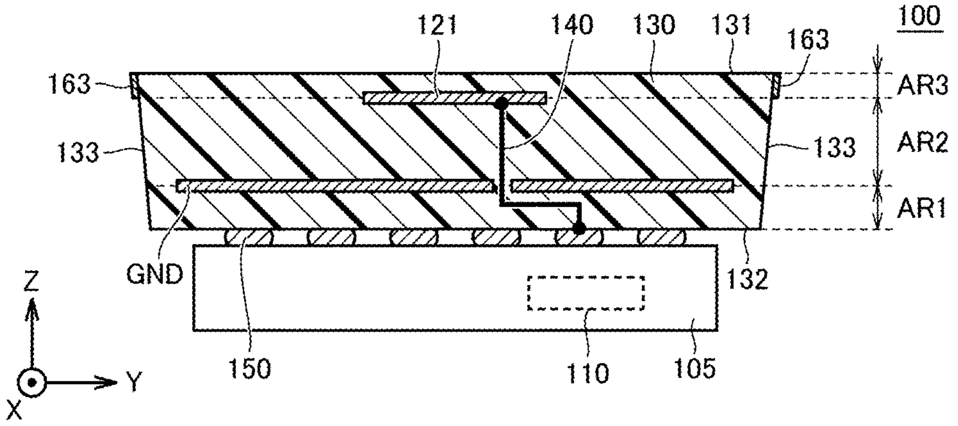
FIG. 5 is a transparent cross-sectional view illustrating a second modification of an arrangement of a carbide position.

FIG. 5 is a transparent cross-sectional view illustrating the second modification of an arrangement of a carbide position in the antenna module 100. In the antenna module 100 of FIG. 5, a carbide 163 is arranged in at least a part of the third region AR3 between the radiating element 121 and the upper surface 131 on the side surface 133 of the dielectric substrate 130. Since the radiation of radio waves in the side surface direction of the dielectric substrate 130 is suppressed by the shielding effect of the carbide 163, the directivity of radio waves radiated from the radiating element 121 can be improved.

Figure 6:
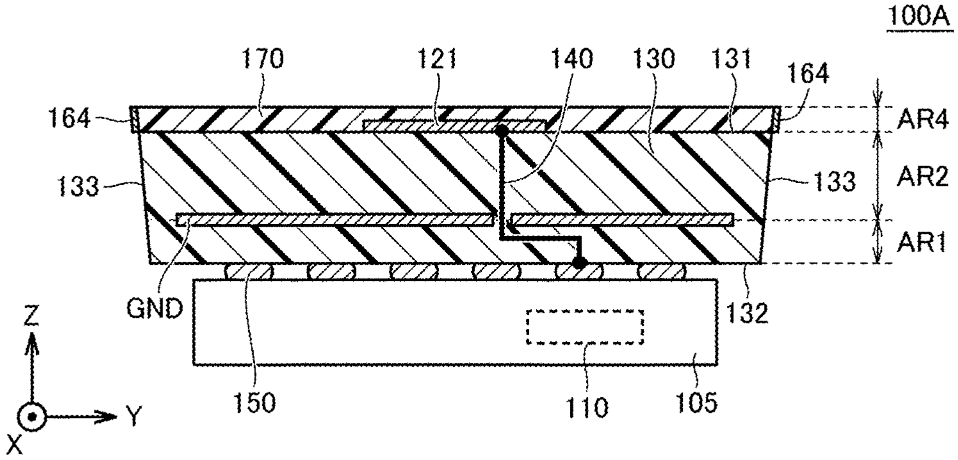
FIG. 6 is a transparent cross-sectional view illustrating an antenna module according to a modification.

FIG. 6 is a transparent cross-sectional view illustrating an antenna module 100A of a modification. In the antenna module 100 described above, the radiating element 121 is arranged in the inner layer of the dielectric substrate 130. In the antenna module 100A of the modification, the radiating element 121 is exposed on the upper surface 131 of the dielectric substrate 130. A protective film (resist) 170 for protecting the radiating element 121 covers the upper surface 131 of the dielectric substrate 130 and the radiating element 121. The protective film 170 is formed of a resin containing a carbon component, such as an epoxy-modified resin, a pigment, an organic solvent, a sensitizer, or a thermosetting catalyst, for example.

Furthermore, in the antenna module 100A, a carbide 164 is arranged in at least a part of a fourth region AR4 of the side surface of the end portion in the Y-axis direction of the protective film 170. As described above, in the case of the configuration in which the radiating element 121 is arranged on the upper surface 131 of the dielectric substrate 130, by disposing the carbide 164 on the side surface of the protective film 170 arranged on the upper surface 131 of the dielectric substrate 130 so as to cover the radiating element 121, the radiation of radio waves in the side surface direction of the dielectric substrate 130 is suppressed, so that the directivity of radio waves radiated from the radiating element 121 can be improved.

(c) Third Modification

Figure 7:
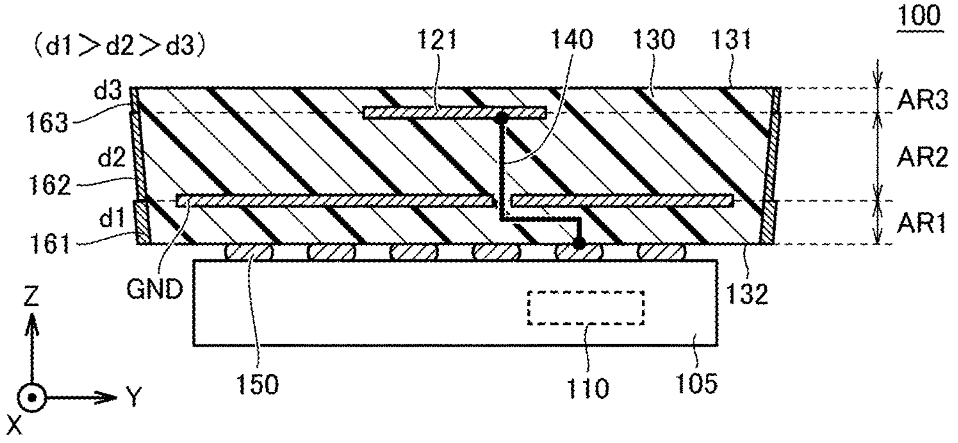
FIG. 7 is a transparent cross-sectional view illustrating a third modification of an arrangement of a carbide position.

FIG. 7 is a transparent cross-sectional view illustrating a third modification of the arrangement of carbide positions in the antenna module 100. In the antenna module 100 of FIG. 7, there is illustrated a configuration in which the carbides 161, 162, and 163 are arranged in at least a part of each of the first region AR1, the second region AR2, and the third region AR3 of the side surface 133 of the dielectric substrate 130.

In this case, when the average thicknesses of the carbides 161, 162, and 163 are set to d1, d2, and d3, respectively, the thickness d1 of the carbide 161 is thicker than the thicknesses d2 and d3 of the carbides 162 and 163, and the thickness d2 of the carbide 162 is thicker than the thickness d3 of the carbide 163 (d1>d2>d3).

As described above, in the wiring layer of the dielectric substrate 130 corresponding to the first region AR1, the wirings for transmitting the power supply signal, the intermediate frequency signal, and the radio frequency signal are arranged. Therefore, the wiring layer generates more electromagnetic noise than the layers of the dielectric substrate 130 corresponding to the other regions, and is easily affected by external electromagnetic noise. In addition, since the radio frequency signal is more likely to be attenuated as a transmission distance becomes longer, electromagnetic noise generated from the feed wiring 140 in the wiring layer corresponding to the first region AR1 is more likely to be larger than the electromagnetic noise generated from the feed wiring 140 in the dielectric substrate 130 corresponding to the second region AR2.

Therefore, by making the thickness d1 of the carbide 161 arranged in the first region AR1 corresponding to the wiring layer thicker than the thickness d2 of second region AR2 and the thickness d3 of the third region AR3, it is possible to reduce the influence of electromagnetic noise generated from the inside of the dielectric substrate 130 and the influence of the external electromagnetic noise.

In addition, it is generally known that the higher the frequency of a signal, the smaller a skin depth at which the signal is transmitted in a conductor due to the skin effect. When electrical resistivity of a conductor is defined as $\rho$, an angular frequency of a signal is defined as $\omega$ (=$2\pi f$: f is the frequency of the signal), and magnetic permeability of the conductor is defined as $\mu$, the skin depth d can be expressed by the following Equation (1).

$$d=(2\rho/\omega\mu)^{1/2} \quad (1)$$

Therefore, in the second region AR2 and the third region AR3 where only the radio frequency signal is transmitted, a sufficient shielding effect can be obtained even when the carbide is made thinner than in the first region AR1 where the wirings for transmitting the power supply signal, the intermediate frequency signal, and the radio frequency signal are arranged.

Note that although FIG. 7 illustrates the case where the carbides are arranged in all of the first region AR1, the second region AR2, and the third region AR3, the carbides may be arranged in at least a part of any two regions of the first region AR1, the second region AR2, and the third region AR3. In this case as well, the thicknesses of the carbides satisfy the relationships d1>d2, d2>d3, and d1>d3.

(d) Fourth Modification

In a fourth modification, a configuration in which a carbide is disposed on the lower surface 132 side of the dielectric substrate 130 will be described.

Figure 8:
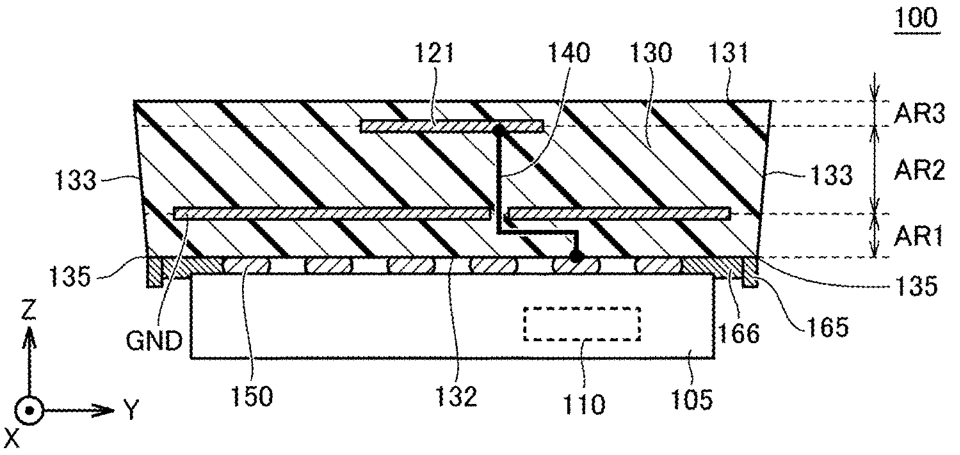
FIG. 8 is a transparent cross-sectional view illustrating a fourth modification of an arrangement of a carbide position.

FIG. 8 is a transparent cross-sectional view illustrating the fourth modification of an arrangement of a carbide position in the antenna module 100. In the antenna module 100 of FIG. 8, a carbide 165 is arranged on at least a part of the lower surface 132 of the dielectric substrate 130 at a position close to the side surface 133.

In addition, a carbide 166 may be arranged in a region between the lower surface 132 of the dielectric substrate 130 and the feed circuit 105. Note that the carbide 166 may be in contact with a solder bump connected to the ground potential among the solder bumps 150, but is arranged so as not to be in contact with a solder bump to which a signal is transmitted.

Since the power supply signal, the intermediate frequency signal, and the radio frequency signal are also transmitted to the solder bump 150, there is a possibility that electromagnetic noise is also radiated from the solder bump 150. In addition, external electromagnetic noise may be electromagnetically coupled to the solder bump 150.

Therefore, by arranging the carbide on the lower surface 132 side of the dielectric substrate 130 and causing the carbide to function as an electromagnetic shield, it is possible to reduce the influence of the electromagnetic noise radiated from the solder bump 150 and to reduce the influence of the external electromagnetic noise on the solder bump 150. Therefore, it is possible to suppress deterioration of antenna characteristics of the antenna module 100.

In one aspect, the carbide 165 is arranged at a portion of a ridge line 135 connecting the lower surface 132 and the side surface 133 of the dielectric substrate 130. With such a configuration, electromagnetic field coupling between an electromagnetic wave generated from the wiring in the wiring layer and a radio wave radiated from the radiating element 121 is suppressed, and electromagnetic field coupling between electromagnetic wave noise from the outside of the antenna module 100 and the wiring in the wiring layer is also suppressed. In addition, the influence of the electromagnetic noise radiated from the solder bump 150 can be reduced, and the influence of the external electromagnetic noise on the solder bump 150 can be reduced. That is, the configuration of the fourth modification can realize both the effect obtained by arranging the carbide in the first region AR1 and the effect obtained by arranging the carbide in at least a part of the position close to the side surface 133 on the lower surface 132 of the dielectric substrate 130.

Note that such carbides 165 and 166 may be generated when the dielectric material melted and carbonized by the irradiation of the laser beam is boiled over to the lower surface 132 side of the dielectric substrate 130 in the cutting process of the antenna module.

Manufacturing Process

Figure 9:
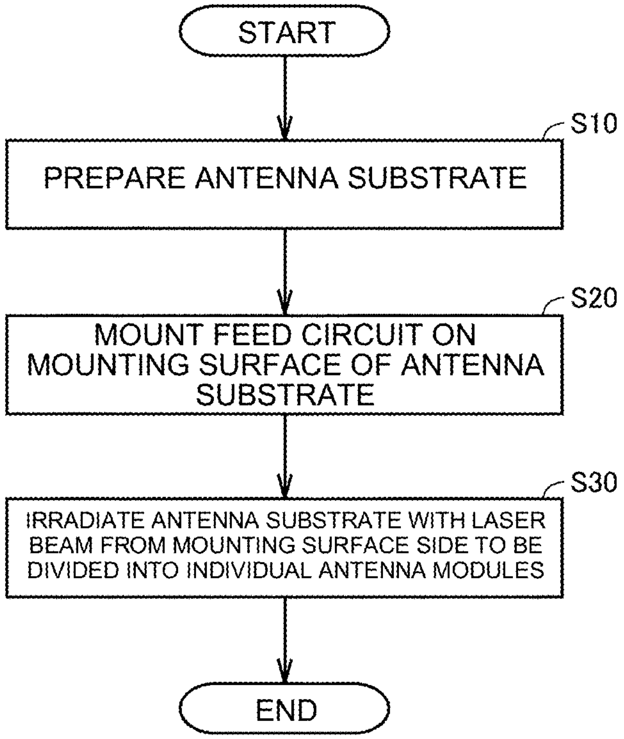
FIG. 9 is a flow chart illustrating a manufacturing process of an antenna module.

Next, a manufacturing process of the antenna module will be described with reference to FIG. 9 and FIG. 10. FIG. 9 is a flowchart for explaining a manufacturing process of the antenna module.

Referring to FIG. 9, in Step (hereinafter, "Step" is abbreviated as S) 10, the antenna substrate 120 is prepared. More specifically, in S10, first, a plurality of dielectric layers to which a conductive sheet such as a copper plate is attached is prepared, and the conductive sheet of each of the dielectric layers is formed into a desired shape to form various electrodes such as the radiating element 121 and a wiring pattern. Further, a through-hole is formed in a portion for via formation in each of the dielectric layers, and the plurality of dielectric layers is laminated. When the plurality of dielectric layers is laminated, the through-hole is filled with a conductive paste. Thereafter, the laminated dielectric layers are subjected to thermal pressure bonding so that the dielectric layers are brought into close contact with each other to form the antenna substrate 120. Note that the antenna substrate formed in S10 includes a plurality of antenna modules.

In S20, the feed circuit 105 is mounted on the mounting surface of the antenna substrate 120. As for the feed circuit, a module in which another substrate on which the RFIC 110, the PMIC, and the like are mounted is resin-molded may be prepared in advance, and the module may be mounted on the mounting surface of the antenna substrate 120. Alternatively, individual components such as the RFIC 110 and the PMIC may be directly mounted on the mounting surface of the antenna substrate 120, and then the mounted components may be resin-molded.

Figure 10:
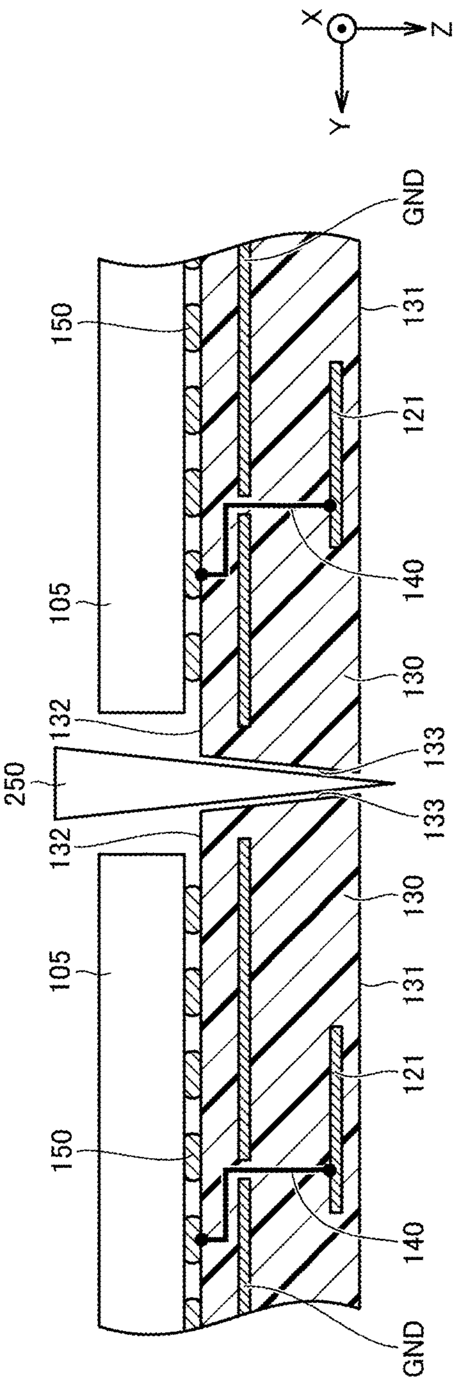
FIG. 10 is a diagram for explaining a cutting process in the manufacturing process.

Thereafter, as illustrated in FIG. 10, in S30, the antenna modules are irradiated with a laser beam 250 from the side of the lower surface 132 on which the feed circuit 105 is mounted, and the antenna modules are each cut and divided into individual antenna modules 100.

By such a manufacturing process, the antenna module 100 is manufactured.

As illustrated in FIG. 10, when the dielectric substrate 130 is divided into the individual antenna modules 100 in S30, the side surface 133 of the dielectric substrate 130 is cut by the laser beam 250. At this time, a carbon component contained in the dielectric substrate 130 is carbonized by thermal energy of the laser beam 250, and carbide is formed on the side surface 133. As such, the carbides 161 to 163 as described in FIG. 3 to FIG. 5 are formed. In addition, when the amount of carbide generated on the side surface 133 is large, part of the carbide formed in the vicinity of the lower surface 132 on the side surface 133 of the dielectric substrate 130 also boils over to the lower surface 132 to form the carbides 165 and 166 as described with reference to FIG. 8.

Note that when the dielectric substrate 130 is irradiated with the laser beam 250 in the normal direction (i.e., the Z-axis direction), the side surface 133, which is a cut surface of the dielectric substrate 130, is slightly inclined with respect to the Z-axis direction due to the beam shape of the condensed laser beam 250. When the laser beam 250 is emitted from the lower surface 132 side, the dimension of the upper surface 131 of the dielectric substrate 130 along the Y axis becomes larger than the dimension of the lower surface 132 along the Y axis.

Figure 11:
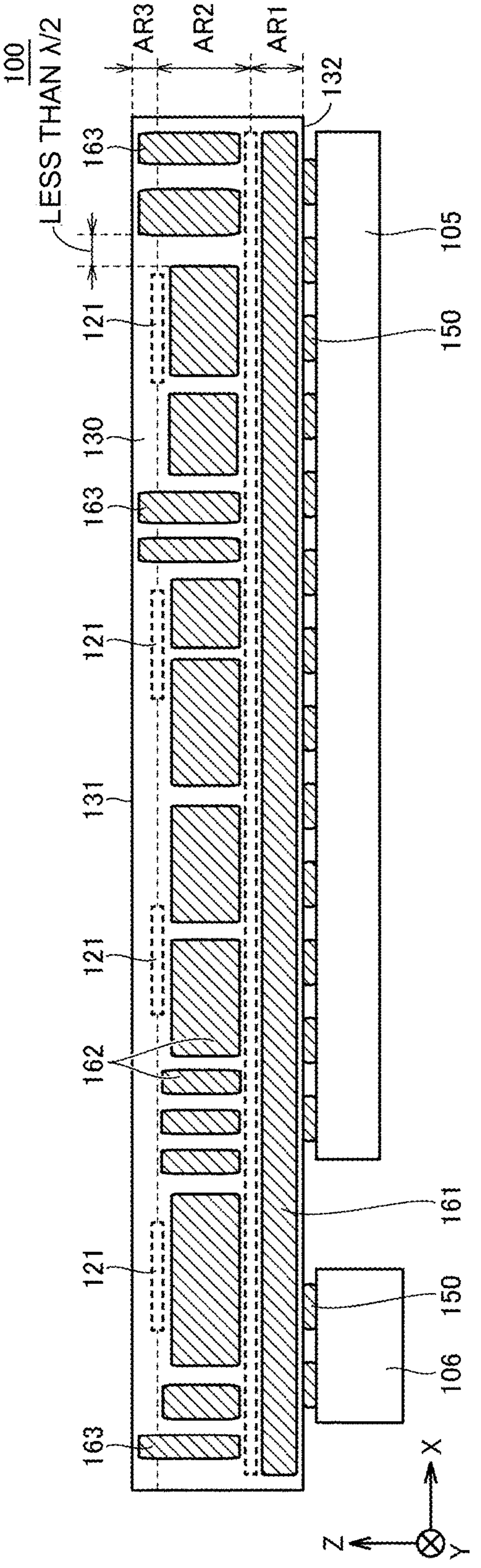
FIG. 11 is an example of a side view when the antenna module is viewed from a Y-axis direction.

In the cutting process of the antenna module, cutting is performed by moving the laser beam 250 in the X-axis direction in FIG. 10. As illustrated in FIG. 10, due to the beam shape of the laser beam 250, the dielectric material is more removed on the lower surface 132 side than on the upper surface 131 side of the dielectric substrate 130. As such, the carbide generated on the side surface of the dielectric substrate 130 is more on the lower surface 132 side than on the upper surface 131 side. Therefore, as illustrated in FIG. 11, when the antenna module 100 is viewed from the Y-axis direction, a proportion of an area of the carbide 161 to an entire area of the first region AR1 on the lower surface 132 side of the side surface 133 may be larger than a proportion of an area of the carbide 162 to an entire area of the second region AR2 and/or a proportion of an area of the carbide 163 to an entire area of the third region AR3. In some examples, the proportion of the area of the carbide 161 to the entire area of the first region AR1 may be greater than the sum of the proportion of the area of the carbide 162 to the entire area of the second region AR2 and the proportion of the area of the carbide 163 to the entire area of the third region AR3. Note that as illustrated in FIG. 11, normally, when the carbide 163 in the third region AR3 is formed, the carbide 162 in the second region AR2 is also formed continuously.

In addition, since the amount of carbide generated on the lower surface 132 side of the side surface 133 is larger than that on the upper surface 131 side, as described with reference to FIG. 7, a thickness of the carbide formed on the lower surface 132 side of the side surface 133 is likely to be larger than a thickness of the carbide formed on the upper surface 131 side.

Since the laser beam 250 is emitted in the Z-axis direction in the drawing, the carbide in each region is formed as an aggregate of linear carbides on the side surface 133 of the dielectric substrate 130. In the first region AR1 on the lower surface 132 side, carbide is formed over the entire region in the X-axis direction, however, the area in which the carbide is formed decreases toward the upper surface 131. That is, the amount of carbide formed in the second region AR2 is smaller than that in the first region AR1. In addition, the amount of carbide formed in the third region AR3 is smaller than that in the second region AR2. Note that when the feed rate of the laser beam 250 in the X-axis direction is increased, the amount of carbide to be formed is decreased, and when the feed rate of the laser beam 250 in the X-axis direction is decreased, the amount of carbide to be formed is increased.

As described above, the electromagnetic noise generated from the feed wiring 140 in the wiring layer of the dielectric substrate 130 corresponding to the first region AR1 tends to be larger than the electromagnetic noise generated from the feed wiring 140 in the dielectric substrate 130 corresponding to the second region and the third region. Therefore, by making the proportion of the area of the carbide 161 to the entire area of the first region AR1 larger than the proportion of the area of the carbide 162 to the entire area of the second region AR2, the proportion of the area of the carbide 163 to the entire area of the third region AR3, or the sum of the proportions of the areas of the carbides 162 and 163 to the entire areas of the second region AR2 and the third region AR3, the influence of the electromagnetic noise generated from the inside of the dielectric substrate 130 and the influence of the external electromagnetic noise can be reduced.

Assuming that a spatial wavelength of the radio wave radiated from the radiating element 121 is λ, when the interval between the carbides is equal to or more than λ/2, a slot formed by the carbide 161, the ground electrode GND, the mounting land of the dielectric substrate 130, and the like functions as a slot antenna in the first region. In addition, in the second region, a slot formed by the carbide 162, the ground electrode GND, the radiating element 121, and the like functions as a slot antenna. Therefore, radio waves may be radiated from the carbide. As such, in each region, the interval between adjacent carbides is less than λ/2.

In addition, when the size (length, width) of the formed carbide is equal to or more than λ/4, the carbide itself functions as a parasitic element and is excited, and radio waves may be radiated from the carbide. Therefore, the size of the carbide is desirably less than λ/4.

As described above, in the antenna module according to Embodiment 1, the carbide is formed on the side surface of the dielectric substrate by the cutting process using the laser beam in the manufacturing process of the antenna module, and the carbide can be used as an electromagnetic shield. Therefore, as compared with the case where the electromagnetic shield is formed by coating a metal material by sputtering, the same function can be exhibited by a simpler manufacturing process. This can reduce the working time and cost in the manufacturing process.

Note that the "radiating element 121" in Embodiment 1 corresponds to a "first radiating element" in the present disclosure. The "upper surface 131" and the "lower surface 132" of the dielectric substrate 130 in Embodiment 1 correspond to a "first surface" and a "second surface" in the present disclosure, respectively. The "side surface 133" of the dielectric substrate 130 in Embodiment 1 corresponds to a "side surface" in the present disclosure.

Embodiment 2

In Embodiment 2, a configuration to which a feature of the present disclosure is applied in the case of a so-called dual-band type antenna module in which two radiating elements having different sizes are stacked in a stacking direction of a dielectric substrate will be described.

Figure 12:
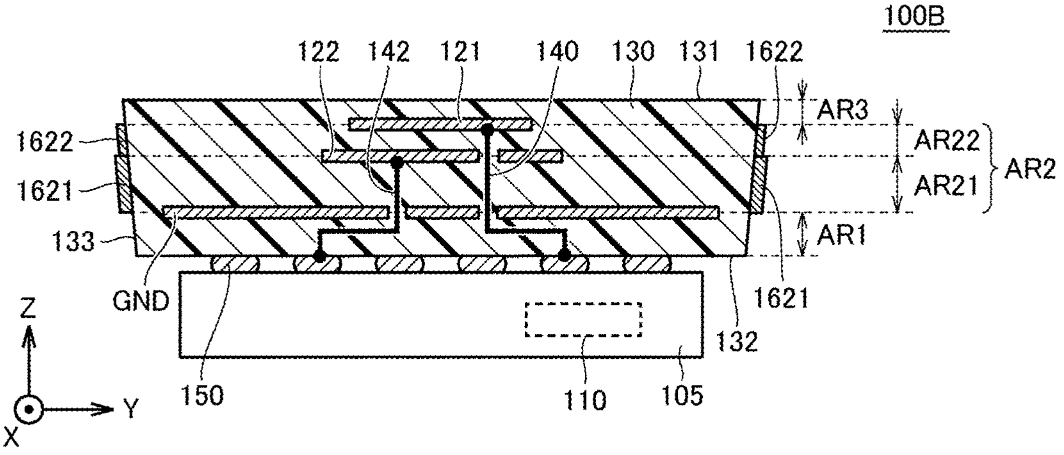
FIG. 12 is a transparent cross-sectional view of an antenna module according to Embodiment 2 when viewed from the X-axis direction.

FIG. 12 is a transparent cross-sectional view of an antenna module 100B according to Embodiment 2 when viewed from the X-axis direction. The antenna module 100B according to Embodiment 2 further includes, in addition to the radiating elements 121, a radiating element 122 arranged between the radiating element 121 and the ground electrode GND, and a feed wiring 142 for supplying radio frequency signals to the radiating element. In addition, carbides 1621 and 1622 are arranged on the side surface 133 of the dielectric substrate 130. The other configuration of the antenna module 100B is the same as that of the antenna module 100, and the description of the elements common to FIG. 3 will not be repeated.

Like the radiating element 121, the radiating element 122 is a patch antenna having a substantially square flat plate shape. In plan view from the Z-axis direction, the radiating element 121 overlaps the radiating element 122. The size of the radiating element 122 is larger than the size of the radiating element 121, and a resonant frequency of the radiating element 122 is lower than the resonant frequency of the radiating element 121. Therefore, the radiating element 122 radiates radio waves in a frequency band lower than that of the radiating element 121. That is, the antenna module 100B is a dual-band type antenna module capable of radiating radio waves in two different frequency bands.

The feed wiring 140 arranged in the dielectric substrate 130 extends from the solder bump 150 through the wiring layer, passes through the ground electrode GND and the radiating element 122, and is connected to the radiating element 121. Radio frequency signals corresponding to the frequency band of the radiating element 121 are supplied from the RFIC 110 to the feed wiring 140. In addition, the feed wiring 142 extends from the solder bump 150 in the wiring layer, passes through the ground electrode GND, and is connected to the radiating element 122. Radio frequency signals corresponding to the frequency band of the radiating element 122 are supplied from the RFIC 110 to the feed wiring 142.

In the antenna module 100B, the second region AR2 between the radiating element 121 and the ground electrode GND on the side surface 133 of the dielectric substrate 130 is divided into a first sub-region AR21 and a second sub-region AR22. The first sub-region AR21 is a region between the radiating element 122 and the ground electrode GND on the side surface 133. In addition, the second sub-region AR22 is a region between the radiating element 121 and the radiating element 122 on the side surface 133.

The carbide 1621 is arranged in at least a part of the first sub-region AR21, and the carbide 1622 is arranged in at least a part of the second sub-region AR22. Here, a thickness of the carbide 1621 arranged in the first sub-region AR21 is thicker than a thickness of the carbide 1622 arranged in the second sub-region AR22.

In general, a signal in a radio frequency region is more likely to be attenuated in a signal transmission path as the frequency becomes higher, and is more likely to be attenuated as the signal transmission distance from the feed circuit becomes longer. As such, the radio frequency signal supplied for radiating radio waves from the radiating element 121 in the feed wiring 140 is more likely to be attenuated than the radio frequency signal supplied for radiating radio waves from the radiating element 122 in the feed wiring 142. Therefore, the intensity of the electromagnetic noise radiated from the portion of the feed wirings 140 and 142 corresponding to the first sub-region AR21 is greater than the intensity of the electromagnetic noise radiated from the portion of the feed wiring 140 corresponding to the second sub-region AR22. Thus, by making the thickness of the carbide 1621 arranged in the first sub-region AR21 thicker than the thickness of the carbide 1622 arranged in the second sub-region AR22, it is possible to appropriately suppress the influence of the electromagnetic noise radiated from the feed wiring 140.

In addition, the carbide 1621 in the first sub-region AR21 needs to shield the radio waves radiated from both of the radiating elements 121 and 122, and the carbide 1622 in the second sub-region AR22 only needs to shield the radio waves radiated from the radiating element 121. As described in Equation (1) above, as the frequency of a signal increases, the skin depth of the signal decreases. Therefore, also from the viewpoint of the skin effect, the thickness of the carbide 1622 arranged in the second sub-region AR22 can be made thinner than the thickness of the carbide 1621 arranged in the first sub-region AR21.

Furthermore, a proportion of an area of the carbide 1621 to an area of the first sub-region AR21 in the first sub-region AR21 may be greater than a proportion of an area of the carbide 1622 to an area of the second sub-region AR22 in the second sub-region AR22. Even in such a configuration, it is possible to appropriately suppress the influence of the electromagnetic noise radiated from the feed wiring 140.

Note that the "radiating element 122" in Embodiment 2 corresponds to a "second radiating element" in the present disclosure.

Embodiment 3

In Embodiment 3, a method of reducing the size of an antenna module by emitting a laser beam at an angle in the cutting process of the antenna module will be described.

As described with reference to FIG. 10 of Embodiment 1, when the laser beam 250 is emitted from the normal direction of the mounting surface (lower surface 132) of the antenna module 100 in the cutting process of the manufacturing process, the dimension along the Y axis on the upper surface 131 side of the dielectric substrate 130 becomes larger than the dimension along the Y axis on the lower surface 132 side due to the beam shape of the condensed laser beam 250, and defines the size of the antenna module 100 in the Y-axis direction.

An antenna module arranged in a one-dimensional array as illustrated in FIG. 2 may, for example, be arranged on the side surface of mobile phones and smart phones. In this case, in order to further reduce the thickness, it is necessary to reduce a dimension of the antenna module in the Y-axis direction.

As described above, when the laser beam is emitted from the normal direction of the mounting surface of the antenna module in the cutting process, in order to reduce the dimension in the Y-axis direction, it is necessary to bring the laser beam closer to the feed circuit side. However, since the beam shape of the laser beam is wider on the lower surface side than on the upper surface side, when the laser beam is brought closer to the feed circuit side, the laser beam may come into contact with the feed circuit and cut off the end portion of the feed circuit. In addition, since the cut surface (side surface 133) of the dielectric substrate approaches the radiating element side as a whole, there is also a possibility that the end portion of the ground electrode inside the dielectric substrate is cut off.

When an area of the ground electrode is small relative to that of the radiating element, electric lines of force generated between the radiating element and the ground electrode may go around to the rear surface side of the ground electrode (i.e., the lower surface side of the dielectric substrate). In such a state, unnecessary electromagnetic field coupling may occur between the wiring pattern in the wiring layer or the feed circuit and the radiating element. Then, the electromagnetic field coupling between the radiating element and the ground electrode is not sufficiently obtained, which may result in a decrease in antenna characteristics.

Figure 13:
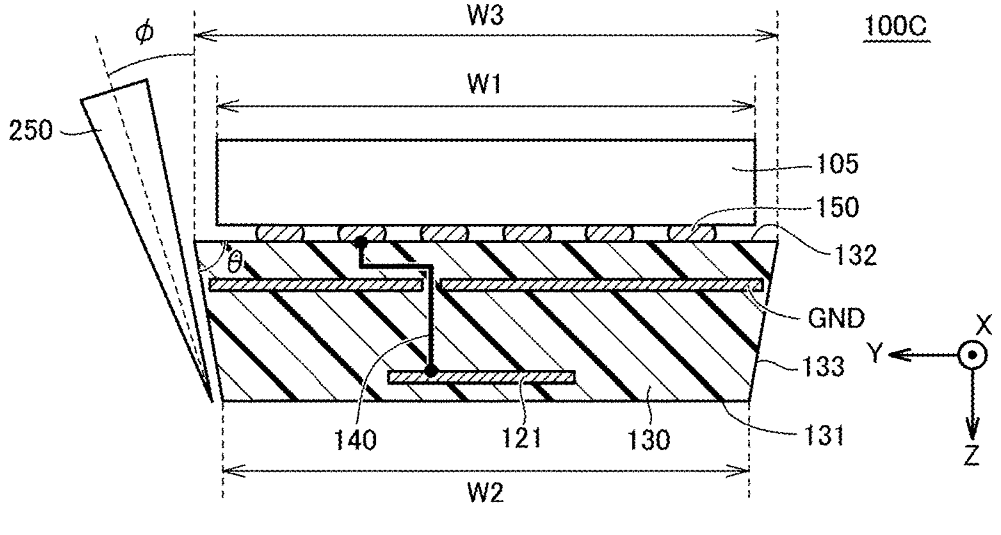
FIG. 13 is a diagram for explaining a laser radiation method in a manufacturing process of an antenna module according to Embodiment 3.

Therefore, in an antenna module 100C according to Embodiment 3, as illustrated in FIG. 13, the mounting surface (lower surface 132) of the dielectric substrate 130 is irradiated with the laser beam 250 at an angle in the cutting process of the manufacturing process, thereby reducing the size of the dielectric substrate 130 along the Y-axis direction without cutting off the end portions of the ground electrode GND and the feed circuit 105. More specifically, when an angle formed by the lower surface 132 and the side surface 133 of the dielectric substrate 130 is defined as $\theta$, the laser beam 250 is inclined such that $\theta$ is equal to or less than 90° ($\theta \leq 90°$).

Figure 14:
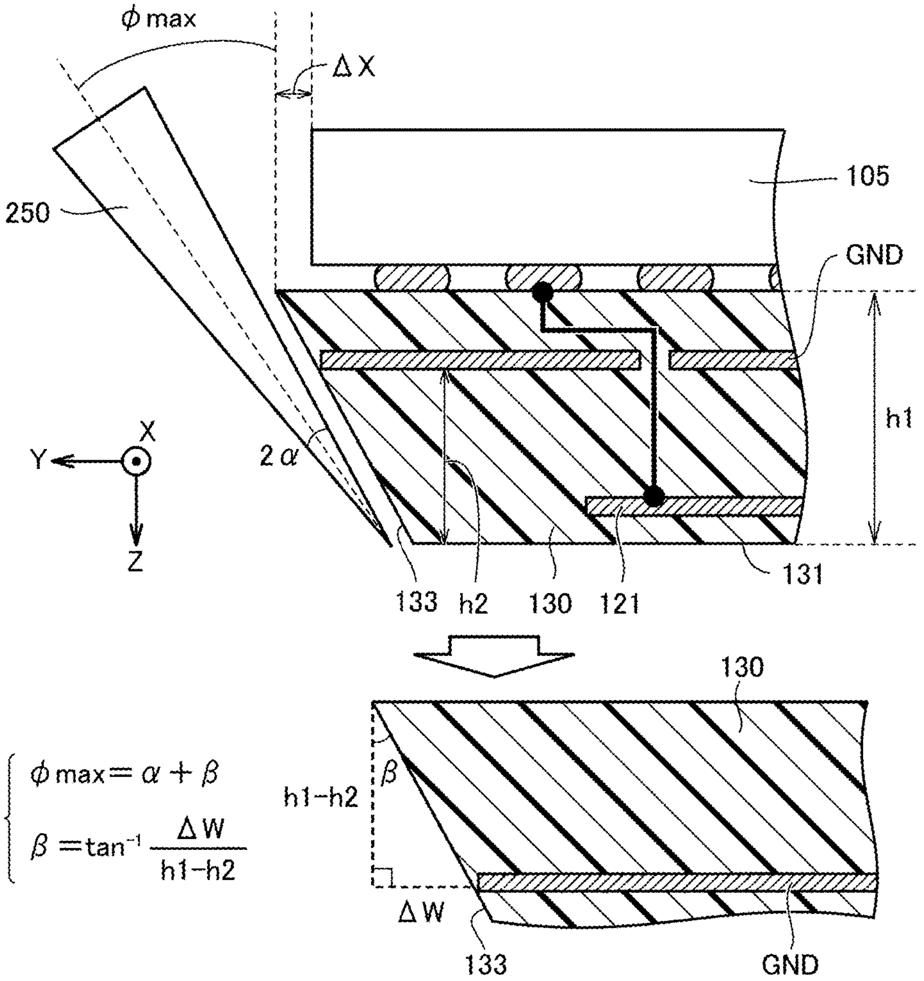
FIG. 14 is a diagram for explaining a maximum inclination angle of a laser beam.

FIG. 14 is a diagram for explaining the maximum inclination angle $\varphi_{max}$ of the laser beam 250 in the case where the dimension of the upper surface 131 of the dielectric substrate 130 in the Y-axis direction is minimized without removing the end portion of the ground electrode GND. Here, the inclination angle $\varphi$ of the laser beam 250 is defined as an inclination angle from a state in which the dielectric substrate 130 is irradiated with the laser beam 250 in the normal direction as in Embodiment 1. In addition, a dimension (thickness) of the dielectric substrate 130 in the Z-axis direction is defined as h1, and a distance from the upper surface 131 of the dielectric substrate 130 to the ground electrode GND is defined as h2. Note that in FIG. 14, it is assumed that a distance between the ground electrode GND and the side surface 133 of the dielectric substrate 130 is minimized without changing the dimension of the lower surface 132 of the dielectric substrate 130.

In a case where the distance between the ground electrode GND and the side surface 133 of the dielectric substrate 130 at the position of the ground electrode GND is 0, when the angle between the Z-axis direction and the side surface 133 is defined as β (=90°−θ), and a distance in the Y-axis direction from the position of the side surface 133 of the dielectric substrate 130 on the lower surface 132 to the end portion of the ground electrode GND is ΔW, the angle β can be expressed by the following Equation (2) as illustrated in the lower part of FIG. 14.

$$\beta=\tan^{-1}\{\Delta W/(h1-h2)\} \quad (2)$$

When the condensing angle of the laser beam 250 is defined as 2∝, the maximum inclination angle $\varphi_{max}$ of the laser beam 250 can be expressed by the following Equation (3).

$$\varphi_{max}=\alpha+\beta \quad (3)$$

Here, as an example, in a case where h1=1000 μm, h2=700 μm, ΔW=100 μm, and α=1.1°, β=18.4° from Equation (2), and the maximum inclination angle $\varphi_{max}$ of the laser beam 250 is 19.5° from Equation (3). That is, by inclining the laser beam 250 so that the inclination angle (p is larger than 0° and smaller than 19.5° (0°<φ<19.5°), the dimension along the Y axis can be reduced as compared with the antenna module 100 of Embodiment 1.

Note that when the size of the feed circuit 105 along the Y axis is defined as W1, and the dimensions of the upper surface 131 and the lower surface side 132 of the dielectric substrate 130 are defined as W2 and W3, respectively, the laser beam 250 is emitted at an inclination so as to satisfy W2≤W1 and W2≤W3.

In addition, when the inclination angle φ of the laser beam 250 is larger than 1.1°, the dimension W3 of the lower surface side 132 of the dielectric substrate 130 becomes larger than the dimension W2 of the upper surface 131 of the dielectric substrate 130, and the size of the antenna module in the Y-axis direction is defined by the dimension W3 of the lower surface side 132 of the dielectric substrate 130. Therefore, in order to further reduce the dimension of the antenna module in the Y-axis direction, it is necessary to reduce a dimensional difference ΔX between the feed circuit 105 and the dielectric substrate 130 in the Y-axis direction. In this case, when the end position of the ground electrode GND is the same, the maximum inclination angle $\varphi_{max}$ of the laser beam 250 is smaller than that in the example described above.

The "Y-axis direction" in Embodiment 3 corresponds to a "first direction" in the present disclosure.

Embodiment 4

In Embodiment 4, a configuration in which a feature of the present disclosure is applied to a dielectric substrate having two flat portions whose normal directions are different from each other will be described.

Figure 15:
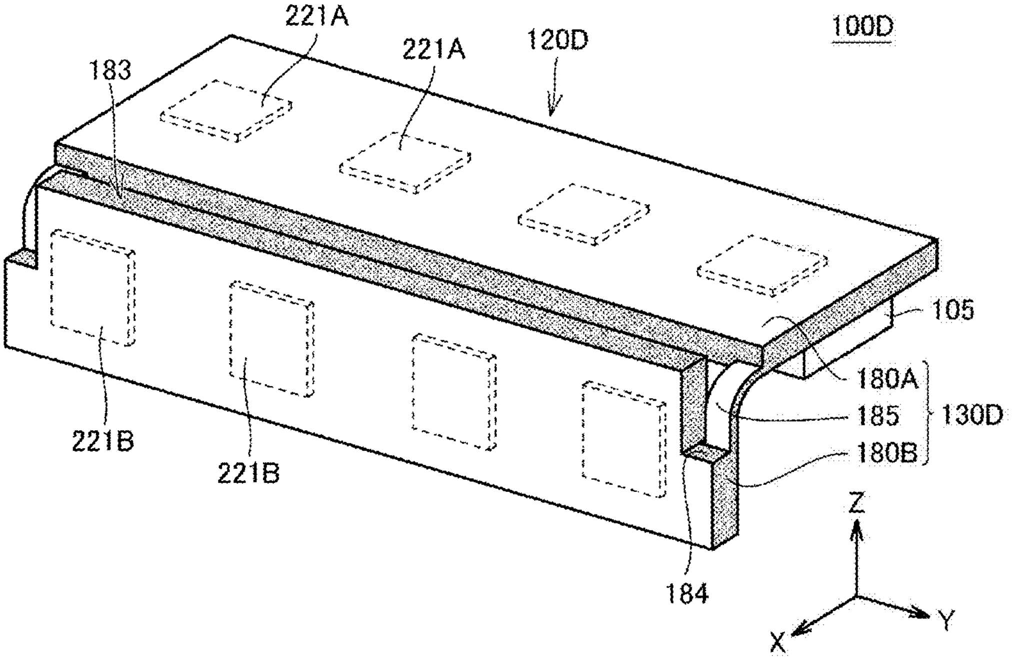
FIG. 15 is a perspective view of an antenna module according to Embodiment 4.

FIG. 15 is a perspective view of an antenna module 100D according to Embodiment 4. An antenna device 120D of the antenna module 100D includes a dielectric substrate 130D, a plurality of radiating elements 221A and 221B, and the feed circuit 105.

The dielectric substrate 130D includes a flat portion 180A having a normal direction in the Z-axis direction, a flat portion 180B having a normal direction in the X-axis direction, and a bent portion 185 connecting the two flat portions. Each of the flat portions 180A and 180B has a substantially rectangular shape having a long side in the Y-axis direction. A depressed portion 184 is formed at an end portion of the flat portion 180B in the Y-axis direction. A protruding portion 183 protrudes in the positive direction of the Z axis from the position of a bottom portion of the depressed portion 184 in a portion of the flat portion 180B where the depressed portion 184 is not present. In addition, the bent portion 185 extending in the X-axis direction from the flat portion 180A is connected to the bottom portion of the depressed portion 184. When the dielectric substrate 130D is viewed in plan view from the Y-axis direction, it has a substantially L-shape.

A plurality of radiating elements 221A is arranged at equal intervals in the Y-axis direction on a main surface of the flat portion 180A in the positive direction of the Z axis or in an internal dielectric layer close to the main surface. In addition, a plurality of radiating elements 221B is arranged at equal intervals in the Y-axis direction on a main surface of the flat portion 180B in the positive direction of the X axis or in an internal dielectric layer close to the main surface. The feed circuit 105 is mounted on a main surface of the flat portion 180A in the negative direction of the Z axis.

The feed wiring for supplying a radio frequency signal to the radiating element 221A is connected from the feed circuit 105 to the radiating element 221A through the flat portion 180A. In addition, the feed wiring for supplying a radio frequency signal to the radiating element 221B is connected from the feed circuit 105 to the radiating element 221B through the flat portion 180A, the bent portion 185, and the flat portion 180B.

In each of the flat portions 180A and 180B, carbide is formed on the side surface connecting the opposing main surfaces. The carbide on the side surface of each flat portions is formed by the following process.

Figure 16:
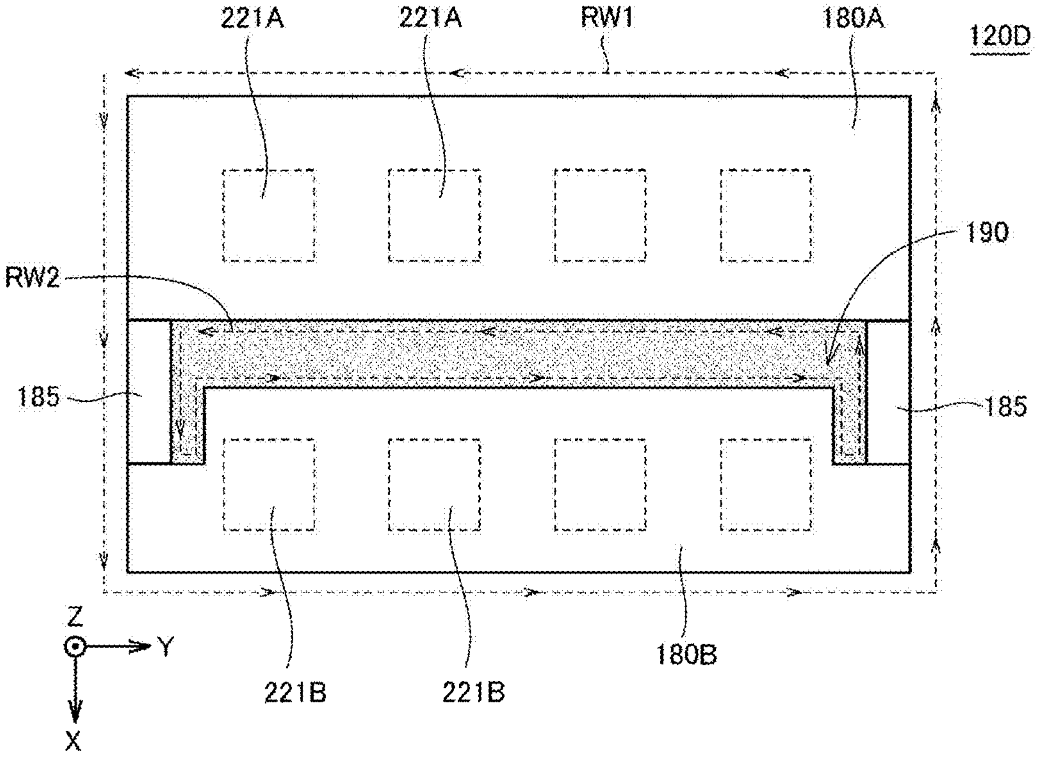
FIG. 16 is a diagram for explaining a formation process of carbide in the antenna module of FIG. 15.

FIG. 16 is a diagram for explaining a forming process of carbide in the antenna module of FIG. 15, and shows a plan view of the dielectric substrate 130D before the flat portion 180B is bent.

In the dielectric substrate 130D having a flat plate shape in which the radiating elements 221A and 221B are formed, the flat portion 180A and the flat portion 180B are separated from each other, and in order to form the protruding portion 183 of the flat portion 180B, an opening portion 190 is formed by emitting a laser beam along a path indicated by a dashed arrow RW2. At this time, carbide is formed on the side surface along the portion irradiated with the laser beam. In addition, as for the portion of the bent portion 185, the dielectric layer on the upper surface side is removed by the laser beam so as not to penetrate the substrate.

Then, in order to divide the dielectric substrate 130D into individual pieces and adjust the shape of the dielectric substrate 130D, an outer periphery of the dielectric substrate 130D is removed by the laser beam along a path indicated by a dashed arrow RW1. As a result, carbide is formed on the side surface of the outermost periphery of the dielectric substrate 130D.

When the shape of the dielectric substrate 130D is adjusted by the laser beam, the portion of the bent portion 185 is bent and the dielectric substrate 130D having a substantially L shape as illustrated in FIG. 15 is obtained. Since carbide is formed on the side surface of each flat portion by the laser beam, it is possible to suppress the influence of electromagnetic noise radiated from the feed wiring.

Aspect

It will be understood by those skilled in the art that the embodiments described above are specific examples of the following aspects.

(Item 1) An antenna module according to an aspect includes an antenna substrate and a feed circuit. The antenna substrate has a first surface and a second surface, and a first radiating element having a flat plate shape is arranged on the antenna substrate. The feed circuit is mounted on the second surface of the antenna substrate and supplies a radio frequency signal to the first radiating element. The antenna substrate includes a dielectric substrate on which the first radiating element is arranged, a ground electrode, a feed wiring, and carbide. The ground electrode is arranged between the first radiating element and the second surface in the dielectric substrate. The feed wiring transmits a radio frequency signal supplied from the feed circuit to the first radiating element. The carbide is disposed on at least a part of a side surface connecting the first surface and the second surface in the dielectric substrate.

(Item 2) In the antenna module according to Item 1, the carbide is disposed in a first region between the ground electrode and the second surface on the side surface of the dielectric substrate.

(Item 3) In the antenna module according to Item 1 or 2, the carbide is disposed in a second region between the first radiating element and the ground electrode on the side surface of the dielectric substrate.

(Item 4) In the antenna module according to any one of Items 1 to 3, the first radiating element is arranged inside the dielectric substrate. The carbide is disposed in a third region between the first radiating element and the first surface on the side surface of the dielectric substrate.

(Item 5) In the antenna module according to any one of Items 1 to 3, the first radiating element is arranged on the first surface. The antenna substrate further includes a protective film arranged on the first surface so as to cover the first radiating element. The carbide is disposed on a side surface of the protective film.

(Item 6) In the antenna module according to any one of Items 1 to 5, the carbide is disposed on the second surface.

(Item 7) In the antenna module according to Item 6, the carbide is disposed between the second surface and the feed circuit.

(Item 8) In the antenna module according to any one of Items 1 to 5, the carbide is disposed at a connection portion between the second surface and the side surface of the dielectric substrate.

(Item 9) In the antenna module according to Item 1, the carbide is disposed in a first region between the ground electrode and the second surface and a second region between the first radiating element and the ground electrode on the side surface of the dielectric substrate. A proportion of an area of the carbide to an area of the first region in the first region is greater than a proportion of an area of the carbide to an area of the second region in the second region.

(Item 10) In the antenna module according to Item 1, the first radiating element is arranged inside the dielectric substrate. The carbide is disposed in a second region between the first radiating element and the ground electrode and a third region between the first radiating element and the first surface on the side surface of the dielectric substrate. A proportion of an area of the carbide to an area of the second region in the second region is greater than a proportion of an area of the carbide to an area of the third region in the third region.

(Item 11) In the antenna module according to Item 9 or 10, the antenna substrate further includes a second radiating element having a flat plate shape arranged between the first radiating element and the ground electrode. In the second region, in a case that a region between the ground electrode and the second radiating element is defined as a first sub-region and a region between the first radiating element and the second radiating element is defined as a second sub-region, a proportion of an area of the carbide to an area of the first sub-region in the first sub-region is greater than a proportion of an area of the carbide to an area of the second sub-region in the second sub-region.

(Item 12) In the antenna module according to Item 1, the first radiating element is arranged inside the dielectric substrate. The carbide is disposed in a first region between the ground electrode and the second surface and a third region between the first radiating element and the first surface on the side surface of the dielectric substrate. A proportion of an area of the carbide to an area of the first region in the first region is greater than a proportion of an area of the carbide to an area of the third region in the third region.

(Item 13) In the antenna module according to Item 1, the first radiating element is arranged inside the dielectric substrate. The carbide is disposed in a first region between the ground electrode and the second surface, a second region between the first radiating element and the ground electrode, and a third region between the first radiating element and the first surface on the side surface of the dielectric substrate. An area of the carbide disposed in the first region is larger than a sum of areas of the carbides arranged in the second region and the third region.

(Item 14) In the antenna module according to Item 1, the carbide is disposed in a first region between the ground electrode and the second surface and a second region between the first radiating element and the ground electrode on the side surface of the dielectric substrate. A thickness of the carbide disposed in the first region is thicker than a thickness of the carbide disposed in the second region.

(Item 15) In the antenna module according to Item 1, the first radiating element is arranged inside the dielectric substrate. The carbide is disposed in a second region between the first radiating element and the ground electrode and a third region between the first radiating element and the first surface on the side surface of the dielectric substrate. A thickness of the carbide disposed in the second region is thicker than a thickness of the carbide disposed in the third region.

(Item 16) In the antenna module according to Item 14 or 15, the antenna substrate further includes a second radiating element arranged between the first radiating element and the ground electrode. In the second region, in a cast that a region between the ground electrode and the second radiating element is defined as a first sub-region and a region between the first radiating element and the second radiating element is defined as a second sub-region, a thickness of the carbide disposed in the first sub-region is thicker than a thickness of the carbide disposed in the second sub-region.

(Item 17) In the antenna module according to Item 1, the first radiating element is arranged inside the dielectric substrate. The carbide is disposed in a first region between the ground electrode and the second surface and a third region between the first radiating element and the first surface on the side surface of the dielectric substrate. A thickness of the carbide disposed in the first region is thicker than a thickness of the carbide disposed in the third region.

(Item 18) In the antenna module according to Item 1, the carbide is formed in a linear shape extending in a direction from the first surface toward the second surface on the side surface of the dielectric substrate.

(Item 19) In the antenna module according to Item 18, in a case that a spatial wavelength of a radio wave radiated from the first radiating element is defined as $\lambda$, an interval between adjacent carbides is less than $\lambda/2$.

(Item 20) In the antenna module according to Item 18, in a case that a spatial wavelength of a radio wave radiated from the first radiating element is defined as λ, a size of the carbide is less than λ/4.

(Item 21) In the antenna module according to Item 1, in the dielectric substrate, an angle formed by the second surface and the side surface is equal to or less than 90°.

(Item 22) In the antenna module according to Item 21, a dimension of the first surface of the dielectric substrate along a first direction in-pane of the first surface is equal to or less than a dimension of the feed circuit along the first direction. A dimension of the second surface along the first direction is larger than a dimension of the feed circuit along the first direction.

(Item 23) A communication device according to another aspect includes the antenna module according to any one of Items 1 to 22.

(Item 24) A method for manufacturing an antenna module according to another aspect includes: (a) preparing an antenna substrate which has a first surface and a second surface and on which a first radiating element having a flat plate shape is arranged; (b) mounting a feed circuit for supplying a radio frequency signal to the first radiating element on the second surface of the antenna substrate; and (c) irradiating a side surface connecting the first surface and the second surface in the antenna substrate with a laser beam from the second surface side of the antenna substrate. A carbide is formed on at least a part of the side surface of the antenna substrate by the step of irradiating with the laser beam.

(Item 25) In the method for manufacturing an antenna module according to Item 24, the irradiating with the laser beam includes the irradiating with the laser beam from a direction in which an angle formed by the second surface and the side surface of the antenna substrate is equal to or less than 90° after the irradiation with the laser beam.

It should be understood that the embodiments disclosed herein are illustrative in all respects and are not restrictive. The scope of the present disclosure is defined not by the above description of the embodiments but by the appended claims, and is intended to include all modifications within the meaning and scope equivalent to the appended claims.

What is claimed is:

1. An antenna module comprising:
- an antenna substrate which has a first surface and a second surface and on which a first radiating element having a flat plate shape is arranged; and
- a feed circuit that is mounted on the second surface of the antenna substrate and supplies a radio frequency signal to the first radiating element,
- wherein the antenna substrate includes:
  - a dielectric substrate on which the first radiating element is arranged;
  - a ground electrode arranged between the first radiating element and the second surface in the dielectric substrate;
  - a feed wiring for transmitting a radio frequency signal supplied from the feed circuit to the first radiating element; and
  - carbide disposed on at least a part of a side surface connecting the first surface and the second surface in the dielectric substrate.

2. The antenna module according to claim 1, wherein the carbide is disposed in a first region between the ground electrode and the second surface on the side surface of the dielectric substrate.

3. The antenna module according to claim 1, wherein the carbide is disposed in a second region between the first radiating element and the ground electrode on the side surface of the dielectric substrate.

4. The antenna module according to claim 1,
- wherein the first radiating element is arranged inside the dielectric substrate, and
- the carbide is disposed in a third region between the first radiating element and the first surface on the side surface of the dielectric substrate.

5. The antenna module according to claim 1,
- wherein the first radiating element is arranged on the first surface,
- the antenna substrate further includes a protective film arranged on the first surface so as to cover the first radiating element, and
- the carbide is disposed on a side surface of the protective film.

6. The antenna module according to claim 1, wherein the carbide is disposed on the second surface.

7. The antenna module according to claim 1, wherein the carbide is disposed at a connection portion between the second surface and the side surface of the dielectric substrate.

8. The antenna module according to claim 1,
- wherein the carbide is disposed in a first region between the ground electrode and the second surface and a second region between the first radiating element and the ground electrode on the side surface of the dielectric substrate, and
- a proportion of an area of the carbide to an area of the first region in the first region is greater than a proportion of an area of the carbide to an area of the second region in the second region.

9. The antenna module according to claim 8,
- wherein the antenna substrate further includes a second radiating element arranged between the first radiating element and the ground electrode,
- in the second region, in a case that a region between the ground electrode and the second radiating element is defined as a first sub-region and a region between the first radiating element and the second radiating element is defined as a second sub-region,
- a proportion of an area of the carbide to an area of the first sub-region in the first sub-region is greater than a proportion of an area of the carbide to an area of the second sub-region in the second sub-region.

10. The antenna module according to claim 1,
- wherein the first radiating element is arranged inside the dielectric substrate,
- the carbide is disposed in a first region between the ground electrode and the second surface and a third region between the first radiating element and the first surface on the side surface of the dielectric substrate, and
- a proportion of an area of the carbide to an area of the first region in the first region is greater than a proportion of an area of the carbide to an area of the third region in the third region.

11. The antenna module according to claim 1,
- wherein the first radiating element is arranged inside the dielectric substrate,
- the carbide is disposed in a first region between the ground electrode and the second surface, a second region between the first radiating element and the ground electrode, and a third region between the first radiating element and the first surface on the side surface of the dielectric substrate, and an area of the carbide disposed in the first region is larger than a sum of areas of the carbides arranged in the second region and the third region.

12. The antenna module according to claim 1, wherein the carbide is disposed in a first region between the ground electrode and the second surface and a second region between the first radiating element and the ground electrode on the side surface of the dielectric substrate, and a thickness of the carbide disposed in the first region is thicker than a thickness of the carbide disposed in the second region.

13. The antenna module according to claim 12, wherein the antenna substrate further includes a second radiating element having a flat plate shape arranged between the first radiating element and the ground electrode, in the second region, in a case that a region between the ground electrode and the second radiating element is defined as a first sub-region and a region between the first radiating element and the second radiating element is defined as a second sub-region, a thickness of the carbide disposed in the first sub-region is thicker than a thickness of the carbide disposed in the second sub-region.

14. The antenna module according to claim 1, wherein the first radiating element is arranged inside the dielectric substrate, the carbide is disposed in a first region between the ground electrode and the second surface and a third region between the first radiating element and the first surface on the side surface of the dielectric substrate, and a thickness of the carbide disposed in the first region is thicker than a thickness of the carbide disposed in the third region.

15. The antenna module according to claim 1, wherein the carbide is formed in a linear shape extending in a direction from the first surface toward the second surface on the side surface of the dielectric substrate.

16. The antenna module according to claim 1, wherein in the dielectric substrate, an angle formed by the second surface and the side surface is equal to or less than 90°.

17. The antenna module according to claim 16, wherein a dimension of the first surface of the dielectric substrate along a first direction in-plane of the first surface is equal to or less than a dimension of the feed circuit along the first direction, and a dimension of the second surface along the first direction is larger than a dimension of the feed circuit along the first direction.

18. A communication device including the antenna module according to claim 1.

19. A method for manufacturing an antenna module, comprising:

preparing an antenna substrate which has a first surface and a second surface and on which a first radiating element having a flat plate shape is arranged;

mounting a feed circuit for supplying a radio frequency signal to the first radiating element on the second surface of the antenna substrate; and irradiating a side surface connecting the first surface and the second surface in the antenna substrate with a laser beam from the second surface side of the antenna substrate, wherein by the irradiating with the laser beam, carbide is formed on at least a part of the side surface of the antenna substrate.

20. The method for manufacturing an antenna module according to claim 19, wherein the irradiating with the laser beam includes the irradiating with the laser beam from a direction in which an angle formed by the second surface and the side surface of the antenna substrate is equal to or less than 90° after the irradiation with the laser beam.

* * * * *